United States Patent
Wantling

[15] 3,640,383
[45] Feb. 8, 1972

[54] SCREENING APPARATUS AND METHOD

[72] Inventor: Joseph W. Wantling, Wellington, Ohio
[73] Assignee: Wedge Wire Corporation, Wellington, Ohio
[22] Filed: Aug. 1, 1969
[21] Appl. No.: 846,726

[52] U.S. Cl. .................................209/17, 209/380, 209/273
[51] Int. Cl. ...............................................................B03b 7/00
[58] Field of Search....................209/17, 273, 274, 281, 380, 209/157, 158, 313, 44, 26, 27, 13, 268, 269

[56] References Cited

UNITED STATES PATENTS

| | | | |
|---|---|---|---|
| 3,477,571 | 11/1969 | Maag | 209/273 X |
| 693,019 | 2/1902 | Holmes | 209/313 X |
| 1,048,171 | 12/1912 | Hughes | 209/157 |
| 2,075,747 | 3/1937 | Nolte | 209/44 |
| 3,116,236 | 12/1963 | Claas | 209/26 |
| 2,200,472 | 5/1940 | Erdmann | 209/44 X |
| 3,058,591 | 10/1962 | Nakahara | 209/17 X |
| 3,421,620 | 1/1969 | Lapeyre | 209/157 |

FOREIGN PATENTS OR APPLICATIONS

| | | | |
|---|---|---|---|
| 156,562 | 3/1921 | Great Britain | 209/157 |
| 619,946 | 5/1961 | Canada | 209/268 |

Primary Examiner—Frank W. Lutter
Assistant Examiner—Ralph J. Hill
Attorney—Dybvig & Dybvig

[57] ABSTRACT

Water is sprayed toward an aggregate through the underside of a sloping screen at spaced intervals along its length. The gaps in the screen are of a constant width for separating the aggregate into two particle groups, an undersize group and an oversize group. In another embodiment, the gaps in the screen increase toward the discharge end for separating or sizing the aggregate into several different particle groups. In both embodiments, a portion of the undesired lightweight particles, such as clay, normally collected with the undersize particles overflows the screen with the oversize particles.

15 Claims, 4 Drawing Figures

PATENTED FEB 8 1972
3,640,383
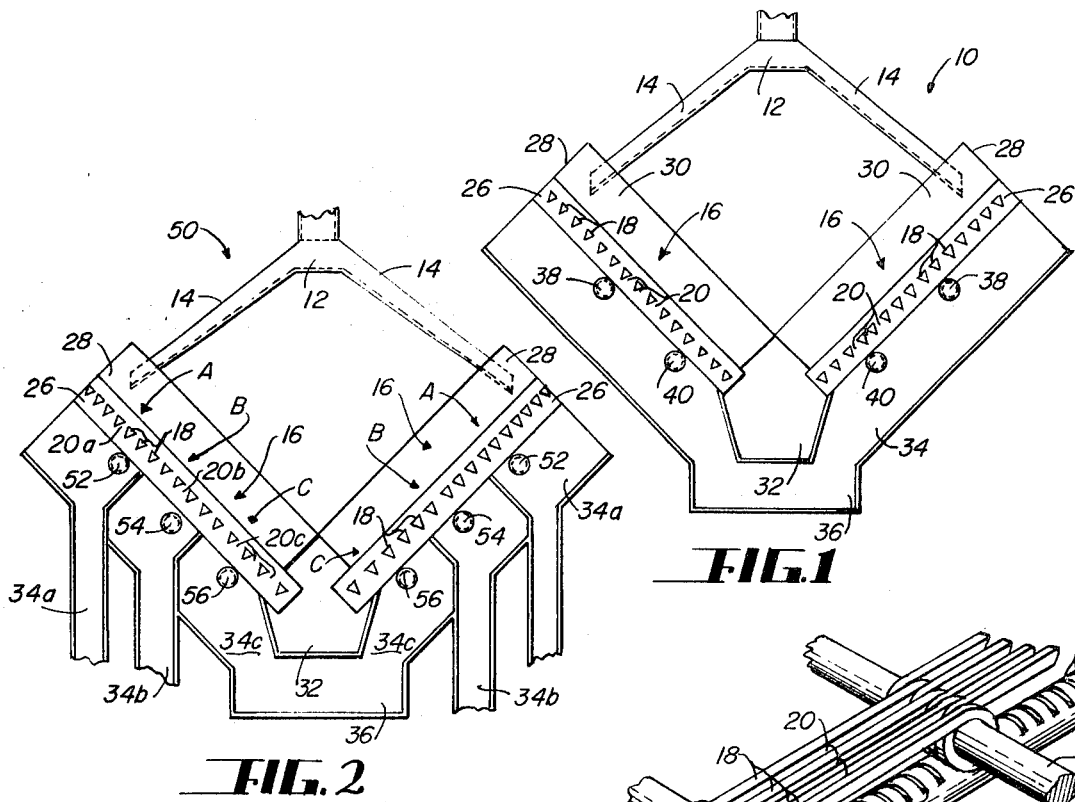
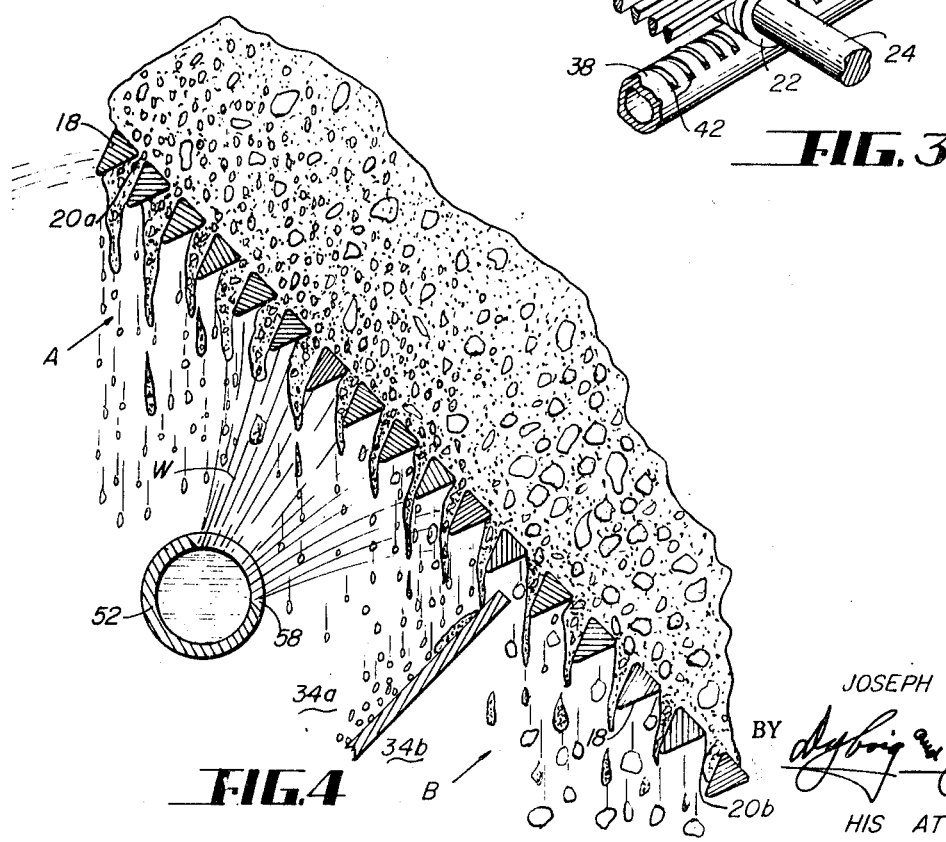
INVENTOR.
JOSEPH W. WANTLING
BY
HIS ATTORNEYS

SCREENING APPARATUS AND METHOD

This invention relates to a screening apparatus and method and more particularly to screening devices and methods for separating or sizing relatively small sand, stone or ore particles.

There is no prior procedure for efficiently separating or sizing very small sand particles and the like. For example, when separating sand particles less than about one-eighth inch from an aggregate, typical screening efficiency is often found to be 50 percent or less. The low efficiency is believed primarily due to the tendency of the small particles, when wet, to adhere to one another and to the larger particles, the adhesion being abetted in most cases by the presence of clay at the particle surfaces. Various elaborate screening devices such as vibrating screens have been devised for accomplishing the desired separation. Vibrating screen devices can be operated more efficiently in terms of the percentage of small particles passed through the screen but they suffer from the drawback that, not only are they expensive, but they are slow in operation, it being necessary to vibrate the screens for an extended period of time in order to pass a significant portion of the small particles through the screen.

Sloping stationary or nonvibrating screens have long been used for sizing aggregates. It might be thought that the sloping screens could be made sufficiently long to permit most of the small particles to pass therethrough. However, the experience with sloping screens has been to the contrary. In practice, the small particles are first mixed with water to form a slurry which is discharged onto the sloping screen. Much of the water in the slurry is freely flowing and, therefore, passes through the screen within the first 18 or 20 inches from the inlet end of the screen. The remaining water and aggregate particles form a tightly packed mass covering the screen just beyond the first 18 or 20 inches and block further passage of small particles through the screen. In order to break up the tightly packed mass of particles, water jets placed above the screen have been used to direct a high pressure spray of water at the packed mass on the screen. This does help to reform a slurry which more readily flows down the screen but does not contribute significantly to the efficiency of the screen. The smaller particles in the reformed slurry, rather than falling through the screen, merely overflow the screen. This effect is believed to be caused by the tendency of the smaller particles, when wet, to adhere to or interfit one another and effectively bridge over the gaps or slots in the screen. The bridges thus formed are sufficiently strong that they cannot effectively be broken up by water sprayed from above. Another factor that contributes to low screening efficiency is the tendency of the wetted smaller particles to cling to the larger particles in the aggregate.

An object of this invention is to provide a highly efficient screening apparatus and method especially adapted to the screening or separation of small particles. In accordance with this invention, water is sprayed toward and through the underside of a stationary sloping screen at approximately the point at which a tightly packed mass of smaller particles would be formed. The water is sprayed at a sufficiently low pressure that the smaller particles can still fall through the screen where the water is applied, yet it has been found the water spray will prevent a bridging over of the slots as well as wash the smaller particles off the coarser particles. The water spray also mixes with the aggregate particles to reform the slurry in order to keep the aggregate moving along the screen. As a result of this invention, the screen need not be vibrated and can be used to handle a constantly flowing aggregate. Efficiencies up to 97 percent have been obtained. That is, 97 percent of the undersized particles in an aggregate continuously fed to a screen have passed through the screen.

Other objects and advantages will become apparent from the following description and the drawing in which:

FIG. 1 is a diagrammatic, end elevational view of apparatus made in accordance with this invention employing two sloping screens for separating particles under a predetermined size from larger particles in an aggregate;

FIG. 2 is a diagrammatic view similar to FIG. 1 of apparatus, again employing two screens, used for separating an aggregate into four different size groups;

FIG. 3 is a perspective view of a portion of a screen and a portion of a spray device in accordance with this invention; and FIG. 4 is an enlarged, longitudinal sectional view of a screen and spray device used in the embodiment of FIG. 2 and illustrating an aggregate with particles thereof passing through the screen gaps.

Referring in greater detail to the drawing, a screening apparatus in accordance with this invention is generally designated 10 in FIG. 1 and includes a spout 12 having two discharge sections 14 through which a slurry composed of small particles of various sizes and water is discharged onto the inlet or upper ends of a pair of confronting screens 16, each of which slopes at an angle of approximately 45°. The slope angle will vary with the type of material but, generally speaking, it must be sufficiently steep to permit the aggregate to slide or roll down the screen although no vibrating force is applied to the screen. On the other hand, the slope angle must be sufficiently shallow that the aggregate does not overflow the screen. With reference also to FIG. 3, the screens illustrated are of the type having closely spaced parallel screen elements or bars 18 separated by gaps or slots 20 having intermediate portions 22 looped about longitudinally extending connecting rods 24. The ends of the screen elements 18 and the connecting rods 24 are fixedly mounted in any suitable fashion in screen frames, generally designated 26, which are only diagrammatically shown in FIG. 1. The screen frames 26 are fixedly mounted in a suitable housing having top walls 28 and end walls 30 which project above the screen 16 for preventing the loss of any of the aggregate. All of the particles flowing over the screens 16 are accumulated in a centrally located oversize bin or hopper 32 at the lower or discharge ends of the screens 16. The particles which are sufficiently small to pass through the slots 20 fall down a second hopper 34 into an undersize bin or hopper 36 which is located beneath the oversize bin or hopper 32.

It is to be understood that the apparatus 10 as thus far described may be entirely conventional. The bins or hoppers 32 and 36 may themselves be sloping so that the particles collected therein will fall therealong into other bins or hoppers or the like (not shown). Those skilled in the art will realize that the invention which will be described below could be used where there is only one screen 16 rather than the two screens 16 illustrated. The spout 12 with its discharge sections 14 is also conventionally illustrated. Various other arrangements may be used for passing the slurry onto the screens 16. Preferably, the slurry is discharged onto the screens 16 evenly over the entire widths thereof.

It is also to be understood that the illustration of the screen 16 in FIG. 1 is diagrammatic. The screen elements 18 may be on the order of one-eighth inch wide and the gaps or slots 20 therebetween may be on the order of a few thousandths to a few tenths of an inch. The screen itself may be on the order of 3 to 10 feet long or even longer. Thus, in a typical installation there would be many more screen elements 18 than illustrated. Usually such screens are on the order of 4 or 5 feet wide.

In accordance with this invention the screen elements 18 are transversely extending rather than longitudinally extending. It has been found that sloping screens having longitudinally extending screen elements are not satisfactory for separating small particles. This is believed due to the tendency of the small particles to either build up upon the longitudinally extending screen elements or else simply slide therealong down into the oversize bin 32.

Using fixed, sloping screen constructions of the type described above it has been found that the freely flowing water component of the slurry emitted from the discharge sections 14 passes through the screen slots 20 in approximately the first 18 or 20 inches. The falling water carries with it a considerable part of the undersize particles. The remaining water wets the particles remaining on top of the screen whereupon a tightly packed mass is formed which bridges over the lower slots 20. As a result, only the first 18 or 20 inches of a sloping screen are effective in separating out the smaller, undersize particles. Many of the undersize particles, therefore, remain on top of the screen or else fall into the oversize bin.

In accordance with this invention, the packing of a mass of particles and the bridging of the slots 20 of each screen 16 is prevented by directing a spray of water under low pressure from underneath the screen 16 upwardly through the screen openings 20 along a narrow, transversely extending band located just beyond the point at which the freely flowing water in the initially formed slurry falls through the screen. The band of water may be approximately 4 inches wide and sprayed through the screen openings 20 approximately 20 inches from the top of each screen 16 along its entire width. The pressure of the water directed against the screen is sufficient to obviate any tendency of the smaller particles to bridge over the slots 20 and I believe that the water spray washes off the undersize particles that have clung to the oversize particles. The water in the spray also reforms the slurry which then continues to flow down the screen. If the screen is sufficiently long, one or more additional bands or sprayed water are provided for the same purpose where bridging of the slots 20 would again occur. In the apparatus 10 of FIG. 1, the screens 16 are approximately 4 feet long. Adjacent and underneath each screen 16 is provided a transversely extending spray head 38 approximately 20 inches from the upper ends thereof. A second spray head 40 associated with each screen 16 is located approximately 20 inches further from the screen inlet ends than the first spray head 38.

Referring again to FIG. 3, the spray head 38 is shown as comprising an elongate hollow tube or pipe located parallel to the screen elements 18 and having a plurality of spaced slits or spray nozzle openings 42 so arranged as to face or open toward the underside of the screen elements 18. One end of the hollow tube is closed and the other end connected to any suitable supply of water (not shown). For example, the open end of the tube can be directly connected to a city water supply. The water is sprayed under relatively low pressure from the hollow tube because of the several openings 42. Valve means (not shown) are preferably placed in the water supply for controllably adjusting the pressure of the upwardly directed spray. The construction of the spray head 40 may be identical to the spray head 38. The mounting of the spray heads 38 and 40 relative to the screens 16 may take any convenient form.

FIG. 2 illustrates another screening apparatus in accordance with this invention which is generally designated 50. In FIG. 2 the portions of the apparatus 50 corresponding to those of FIG. 1 are given the same reference characters and detailed description thereof is believed unnecessary. The apparatus 50 is intended for use in separating particles into four groups rather than two groups. Thus, there are three undersize hoppers, designated 34a, 34b, and 34c in FIG. 2, for each screen 16. The two undersize hoppers 34c, since they collect particles of the same size, are shown both emptying into the single bin 36. The undersize hoppers 34a and 34b associated with the two screens 16 are connected together for the same purpose. The oversize particles again fall into a centrally located oversize bin 32.

In order to achieve the particle size separations in FIG. 2, the screens 16 are divided into sections A, B and C having transversely extending screen elements 18 separated by gaps or slots, designated 20a, 20b and 20c, which are progressively of greater widths from the inlet to the discharge ends of the screens 16. Again it will be appreciated that the illustration in FIG. 2 is diagrammatic and normally there would be many more screen elements 18 and gaps or slots 20a, 20b and 20c than illustrated. Those familiar with the art will recognize that this general relationship of screens to a plurality of collecting hoppers or bins is well known. In accordance with this invention, a plurality of spray heads 52, 54 and 56, which may be identical to the spray head 38, are mounted generally parallel to the screen elements 18. As in the case of FIG. 1, the uppermost spray heads 52 are located approximately 20 inches from the upper end of the associated screen 16. The two spray heads 54 are located approximately 20 inches beyond and lower than the spray heads 52 and, finally, the lowermost spray heads 56 are located approximately 20 inches beyond and lower than the spray heads 54. As also described above in connection with the spray heads 38 and 40, the spray heads 52, 54 and 56 are effective to spray a narrow band of water under low pressure through the screen openings along substantially the entire width of the underside of the screens 16.

It will be noted that the spray heads 52 are illustrated as relatively close to the adjacent lower walls of the hoppers 34a. This spacing, of course, will depend upon the length of the screens 16 as well as the type of aggregate to be separated by the screens 16. FIG. 4 is illustrative of the screen 16 shown on the left-hand size of FIG. 2 covered by a slurry of water with an aggregate comprised primarily of fine sand and small stones. As previously mentioned, the freely flowing water in the slurry entering the inlet end of each screen 16 falls through the slots 20 just beyond the inlet end. This water carries with it many of the smaller particles in the slurry which can fall through the effective openings of the slots 20. These particles and the water from the original slurry are shown falling through the slots 20 in the upper left-hand side of FIG. 4 between approximately the first five screen elements illustrated therein. Before the aggregate bridges over the slots 20, it is wetted by the water spray, designated W, emitted from the slots, designated 58, of the spray device 52. As already described, the water spray W not only prevents the forming of bridges over the slots 20, it breaks up the smaller particles which have adhered together or have adhered to the larger particles. The water is sprayed at a sufficiently low pressure that the smaller particles continue to fall through the slots against which the water spray is directed. As a result, most of the smaller particles in the aggregate fall through the screen before reaching the lower wall of the hopper 34a. The oversize aggregate continues to flow down on top of the screen elements 18 ultimately falling either into the hoppers 34b or 34c or else into the oversize bin 32.

Using the screen devices with the water sprays in accordance with this invention, it has been found that smaller particles can be more efficiently separated from oversize particles than with any prior known system including vibrating screens, tumblers, and screens employing spray devices directing water onto the top of the aggregate. As an example, it was found that using a 100-mesh screen, 97 percent of fine masons' sand was separated from an aggregate containing a maximum particles size of three-eighths inch. The water pressure was so adjusted that the water spray extended about 1½ inches above the screen surface.

Although the primary purpose of this invention is to provide a screening apparatus for dividing the particles of an aggregate into different size groups, it has also been found that screening apparatus embodying the invention also separates a significant portion of undesired other very fine and lightweight particles, such as clay, from the undersize sand in an aggregate. The freely flowing water in the slurry fed to the screens naturally carries some of the very fine clay and the light particles with it as it passes through the screens. Accordingly, when using sloping screens without the water spray in accordance with this invention, a significant portion of the undersize particles collected beneath the screens are clay particles. Obviously many of these same clay particles would pass through the screen when the spray in accordance with this invention is provided. However, it is believed that the particles which pass through the screen beyond approximately the first 18 inches are almost entirely free of clay. Therefore, the proportion of clay and other lightweight particles collected with the undersize sand particles is noticeably less. This result can be detected by observing the differences in color of the particles collected. This benefit is obtained because the clay and other lightweight particles are washed from the sand particles by the water spray, the lightweight particles floating to the top of the slurry and flowing to the oversize bin or hopper. Therefore, by virtue of the controllable upward current of the spray water provided by this invention, there is a specific gravity separation as well as the particle size separation described above. As a result, the subsequent washing of the undersize particles collected can be dispensed with or at least considerably simplified. The specific gravity separation of this invention requires no added agents to cause the separation; rather the separation results entirely from the upwardly directed water spray.

This invention has been tested and found most useful with particle sizes ranging from approximately 0.004 inch to approximately 0.1875 inch. Although this invention could be used for separating particles having a greater size, it is not required because normally, with such coarse particles, an ordinary stationary screen is sufficient. The pressure of the water fed to the various spray devices described above will depend upon the particle size which is to be screened as well as the widths of the screens with which they are used. Generally speaking, the water pressure is not critical provided it is sufficient to cause the water spray emitted from the nozzles to pass into the slots 20 without causing the finer particles to be forced to the top of the aggregate.

In the embodiment illustrated in FIG. 2, there are preferably as many spray heads, such as those designated 52, 54 and 56, as there are collection hoppers or bins so that the benefits of the spray are obtained at each section of the screen. Because of this construction, particles which can pass through the screen at any section will be broken up and washed away from the larger particles in the aggregate. In all cases, the water spray should be continuous so that there is a continuous washing of particles and a continuous reforming of the slurry.

Having thus described my invention, I claim:

1. In screening apparatus of the type having a sloping screen with an inlet end and a discharge end, the inlet end being vertically higher than the discharge end, and having means for introducing a slurry of an aggregate to the inlet end of said screen, the improvement comprising spray means for spraying water only through a narrow band of openings in said screen from the underside thereof extending along substantially the entire width thereof, said narrow band of openings spaced from said inlet end, said screen having a second band of openings disposed between said narrow band of openings and said inlet end, said second band of openings being outside the reach of water sprayed from said spray means.

2. The screening apparatus of claim 1 wherein said spray means includes a spray head comprising a hollow pipe having a plurality of spaced spray nozzles opening toward said screen, said pipe extending along substantially the entire width of said screen.

3. The screening apparatus of claim 1 further including a second spray means including a spray head spaced further from said inlet end than said first mentioned spray means.

4. The screening apparatus of claim 3 wherein the spacing between said first-mentioned spray means and said second spray means is substantially equal to the spacing between said first-mentioned spray means and the inlet end of said screen, said screen having a third band of openings disposed between said first-mentioned spray means and said second spray means and outside the reach of the water sprayed by said first-mentioned and second spray means whereupon freely falling water sprayed by said first-mentioned spray means toward said screen can fall from said screen through said third band of openings before more water is added to the aggregate by said second spray means.

5. In screening apparatus of the type having a sloping screen with an inlet end and a discharge end, and means for introducing a slurry of an aggregate to the inlet end of said screen, said screen being mounted in a fixed position with its inlet end vertically higher than its discharge end, and of the type having means for collecting particles of said aggregate which can pass through openings in the screen, and means for collecting particles in the aggregate which overflow the screen at the discharge end thereof, the improvement wherein said sloping screen includes a plurality of spaced, mutually parallel screen elements extending transversely of the length of said screen between its inlet and discharge ends and the improvement further comprising spray means for spraying water only through a narrow band of openings intermediate said inlet and discharge ends of said screen and along substantially the entire width of said screen from the underside thereof, said screen having a second band of openings disposed between said inlet end and said narrow band of openings, said second band of openings being outside the reach of water sprayed from said spray means, said spray means reforming the water slurry with the particles remaining on top of said screen in areas of said screen which are within the reach of water sprayed from said spray means.

6. The screening apparatus of claim 6 wherein there are a plurality of spray means spaced substantially equidistant from one another and located, constructed and arranged to spray water through said screen, there being a band of openings through said screen outside the reach of water sprayed from any of said spray means disposed between each adjacent pair of said spray means.

7. The screening apparatus of claim 5 wherein said screen has a plurality of sections, each section having a different slot width between screen elements than the corresponding slot width of the other sections, the slot widths progressively increasing from the inlet end to the discharge end of said screen.

8. The screening apparatus of claim 7 wherein there are a plurality of spray means, there being one spray means located, constructed and arranged to spray water through a portion of each of said sections of said screen, there being a band of openings through said screen outside the reach of any of said spray means disposed between each adjacent pair of said spray means.

9. The screening apparatus of claim 5 wherein said screen slopes at an angle of approximately 45° from its inlet end to its discharge end.

10. The screening apparatus of claim 9 wherein said spray means is located to spray water toward the underside of said screen at approximately 20 inches from its inlet end.

11. The screening apparatus of claim 10 further including at least one additional spray means adapted to spray water toward the underside of said screen along the entire width thereof approximately 20 inches further beyond said inlet end of said screen than the water sprayed by said first-mentioned spray means, there being a band of openings through said screen outside the reach of any of said spray means disposed between the first-mentioned spray means and said additional spray means.

12. The screening apparatus of claim 5 wherein said spray means includes a spray head extending in generally parallel relation to said screen elements, said spray head having a plurality of spaced openings forming spray nozzles facing the underside of said screen.

13. The method of separating particles in an aggregate including the steps of forming a slurry of the aggregate and water, discharging said slurry onto a sloping screen, permitting substantially all of the water in said slurry to pass through openings in said screen, reforming the slurry by continuously spraying water toward said screen from the underside thereof along a narrow band located just beyond the portion of said screen through which substantially all of the freely flowing water from the initially formed slurry has passed to prevent the formation of a tightly packed mass of wetted particles on said screen whereby bridging of particles over the openings in the screen is prevented.

14. The method of claim 13 further including the steps of again reforming the slurry just beyond the portion of the screen whereat the freely flowing water in the reformed slurry falls from the screen.

15. A method of particle size separation wherein an aggregate of particles is supplied to the uppermost end of a sloping screen in a water slurry, the particles of said aggregate which are sufficiently small passing through transversely extending slits in said screen, the improvement comprising the step of spraying water upwardly through the underside of said screen and transversely along substantially its entire width at a distance from the point at which the water slurry is fed to said screen sufficient to permit most of the water in said slurry to pass through said screen and supplying a second spray to the underside of said screen along substantially its entire width, the second spray being introduced to the underside of said screen beyond the point whereat a substantial portion of water from said first spray falls from said screen.

* * * * *

UNITED STATES PATENT OFFICE
CERTIFICATE OF CORRECTION

Patent No. 3,640,383            Dated February 8, 1972

Inventor(s) Joseph W. Wantling

It is certified that error appears in the above-identified patent and that said Letters Patent are hereby corrected as shown below:

Column 3, line 24, "or" should read ---of---.

Column 4, line 19, "size" should read ---side---.

Column 4, line 51, "particles" should read ---particle---.

Column 6, line 18, "claim 6" should read ---claim 5---.

Signed and sealed this 4th day of July 1972.

(SEAL)
Attest:

EDWARD M. FLETCHER, JR.            ROBERT GOTTSCHALK
Attesting Officer                  Commissioner of Patents